(12) United States Patent
Takizawa et al.

(10) Patent No.: US 6,842,206 B2
(45) Date of Patent: Jan. 11, 2005

(54) SUBSTRATE FOR ELECTRO-OPTICAL PANEL AND FABRICATION METHOD OF THE SAME, ELECTRO-OPTICAL PANEL AND ELECTRONIC DEVICE

(75) Inventors: Keiji Takizawa, Hotaka-machi (JP); Yoshihiro Otagiri, Matsumoto (JP); Tomoyuki Nakano, Toyoshima-machi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/412,599

(22) Filed: Apr. 10, 2003

(65) Prior Publication Data

US 2004/0017525 A1 Jan. 29, 2004

(51) Int. Cl.[7] .............................................. G02F 1/1335
(52) U.S. Cl. ...................... 349/106; 349/113; 349/122; 349/187
(58) Field of Search .................................. 349/106, 107, 349/109, 113, 114, 122, 138, 187; 430/7, 20, 321

(56) References Cited

U.S. PATENT DOCUMENTS

| | | |
|---|---|---|
| 4,793,669 A | 12/1988 | Perilloux |
| 6,542,209 B2 * | 4/2003 | Kim et al. .................. 349/106 |
| 6,600,532 B2 * | 7/2003 | Kishimoto et al. ......... 349/106 |
| 6,671,015 B2 * | 12/2003 | Tanada et al. .............. 349/113 |
| 2003/0030767 A1 * | 2/2003 | Takizawa et al. ........... 349/113 |

FOREIGN PATENT DOCUMENTS

| | | | |
|---|---|---|---|
| EP | 0631171 A1 | | 12/1994 |
| JP | 2002-365422 A | * | 12/2002 |
| WO | WO0137024 | | 5/2001 |

* cited by examiner

*Primary Examiner*—Toan Ton
*Assistant Examiner*—Tai Duong
(74) *Attorney, Agent, or Firm*—Harness, Dickey & Pierce, P.L.C.

(57) ABSTRACT

A transmissive color filter layer is disposed over a transparent substrate such as glass in a transparent display area, and a reflective color filter layer is formed in a reflective display area. An overcoat layer is formed on the transmissive color filter layer and the reflective color filter layer so as to cover both of them. The overcoat layer has a multigap structure having a first layer thickness on the transmissive color filter layer and a second layer thickness on the reflective color filter layer, which is thicker than the first layer thickness. In the substrate for this liquid crystal panel, the overcoat layer is also disposed in the transparent display area. Therefore, the adhesion of the transparent electrode can be enhanced, and the transmissive color filter layer can be protected.

10 Claims, 8 Drawing Sheets

(a)

(b)

(a)

(b)

(c)

(d)

SUBSTRATE FOR ELECTRO-OPTICAL PANEL AND FABRICATION METHOD OF THE SAME, ELECTRO-OPTICAL PANEL AND ELECTRONIC DEVICE

BACKGROUND OF THE INVENTION

1. Field of the Invention

The present invention relates to a semi-transparent reflective type liquid crystal display device, and more particularly to a multigap type liquid crystal device, in which the layer thickness of a liquid crystal layer is changed to an appropriate value between a transparent display area and a reflective display area inside a single pixel.

2. Related Art

Among various liquid crystal devices, a device capable of displaying images in both a transmissive mode and a reflective mode is called semi-transparent reflective type liquid crystal device, which is widely used for mobile phones, portable information terminals, and the like.

This semi-transparent reflective type liquid crystal device is formed, in which a first transparent substrate formed with a first transparent electrode on the surface and a second transparent substrate formed with a second transparent electrode on the surface facing the first electrode sandwich a liquid crystal layer of TN (twisted nematic) mode. Over the first substrate, a light reflection layer configuring a reflective display area is formed inside a pixel area where the first transparent electrode faces to the second transparent electrode, and the area corresponding to an opening disposed in the light reflection layer is a transparent display area. On both outsides of the first substrate and the second substrate, a polarizer is disposed. In addition, on the first substrate side where the light reflection layer is formed, a backlight unit is placed on the further outside of the polarizer.

In the liquid crystal device having such configuration, a light incident into the transparent display area, which is a portion of light emitted from the backlight unit, is incident into the liquid crystal layer from the first substrate side. It is modulated by the liquid crystal layer, and then emitted from the second substrate side as a transmissive display light to display an image (transmissive mode).

A light incident into the reflective display area, which is a portion of light entered from the second substrate side, passes through the liquid crystal layer and reaches the reflective layer. It is reflected by the reflective layer, passes through the liquid crystal layer again, and emitted from the second substrate side as a reflective display light to display an image (reflective mode).

Over the first substrate, a reflective display color filter and a transmissive display color filter are formed over the reflective display area and the transparent display area, respectively. Therefore, color display is possible in both the transmissive mode and the reflective mode.

When the liquid crystal layer modulates light with the above-described methods, a change in the polarization state becomes a function of a product (retardation "$\Delta n \cdot d$"), in which "$\Delta n$" is the refractive index difference and "$d$" is the layer thickness of the liquid crystal layer, in the case where the twisted angle of liquid crystals is set smaller. Thus, when this value is optimized, a display with excellent visibility can be performed. However, in the semi-transparent reflective type liquid crystal device, the transmissive display light passes through the liquid crystal layer only once and then it is emitted, whereas the reflective display light passes through the liquid crystal layer twice. Therefore, it is difficult to optimize the retardation "$\Delta n \cdot d$" in both the transmissive display light and the reflective display light simultaneously. Accordingly, when the layer thickness "$d$" of the liquid crystal layer is set so as to improve visibility of the display in the reflective mode, the display in the transmissive mode is sacrificed. In reverse, when the layer thickness "$d$" of the liquid crystal layer is set so as to improve visibility of the display in the transmissive mode, the display in the reflective mode is sacrificed.

JP-A-11-242226 discloses a semi-transparent reflective type liquid crystal device, in which the layer thickness of the liquid crystal layer in the reflective display area is made smaller than the layer thickness of the liquid crystal layer in the transparent display area. This liquid crystal device is called "multigap type."

This structure can be realized by forming an overcoat layer for adjusting the layer thickness over the reflective display area, more specifically, a reflective display color filter. At this time, the overcoat layer is not formed over a transmissive display color filter. Accordingly, the layer thickness "$d$" of the liquid crystal layer becomes thicker in the transparent display area than in the reflective display area by the thickness of the overcoat layer. Thus, the retardation "$\Delta n \cdot d$" can be optimized with respect to both the transmissive display light and the reflective display light, and an image display with excellent visibility is allowed in both the transmissive mode and the reflective mode.

In the multigap type liquid crystal device as described above, the overcoat layer has an important function of adjusting the layer thickness of the liquid crystal layer in the reflective display area and the transparent display area. The overcoat layer is also called a protective layer, which is inherently formed in the purpose of securing the adhesion of a pixel electrode formed thereon and protecting the transmissive display color filter in the process of forming the pixel electrode. Therefore, in a liquid crystal device which is not the multigap type, for example, the overcoat layer is formed with a flat top face, which serves to enhance the adhesion to the pixel electrode and to protect the transmissive display color filter disposed down below.

However, in the above-described multigap type liquid crystal device, the overcoat layer is omitted in the transparent display area in order to adjust the layer thickness of the liquid crystal layer in the transparent display area and the reflective display area. That is, in the transparent display area, the pixel electrode is formed over the transmissive display color filter without interposing the overcoat layer. Therefore, in the transparent display area, improving the adhesion to the pixel electrode and protecting the transmissive display color filter during the process of forming the pixel electrode, which are the inherent roles of the overcoat layer, are not carried-out. Therefore, the pixel electrode is hard to deposit, which causes problems that the film deposition accuracy is dropped and the adhesion is not sufficient. Additionally, there is also a problem that the transmissive display color filter is damaged in the process of forming the pixel electrode.

The present invention has been made in view of the above-described problems. The object of the invention is to provide a substrate for an electro-optical panel of multigap type capable of effectively preventing reduced adhesion of the pixel electrode and damages to the transmissive display color filter, a fabrication method of the same, an electro-optical panel, and an electronic device.

SUMMARY OF THE INVENTION

In one embodiment of the invention, a substrate for an electro-optical panel has: a substrate; a transmissive color filter layer disposed over the substrate in a transparent display area; a reflective color filter layer disposed over the substrate in a reflective display area; and an overcoat layer for covering both the transmissive color filter layer and the reflective color filter layer, wherein the overcoat layer has a first layer thickness on the transmissive color filter layer and a second layer thickness, thicker than the first layer thickness, on the reflective color filter layer.

In the above-described substrate for the electro-optical panel, the transmissive color filter layer is disposed in the transparent display area and the reflective color filter layer is disposed in the reflective display area over the transparent substrate such as glass. The overcoat layer is formed over the transmissive color filter layer and the reflective color filter layer so as to cover throughout the layers. In addition, the overcoat layer is configured to have the first layer thickness on the transmissive color filter layer and a second layer thickness, thicker than the first layer thickness, on the reflective color filter layer. This structure is also called a multigap structure, in which the layer thickness of the liquid crystal layer in the transparent display area and the layer thickness of the liquid crystal layer in the reflective display area are adjusted, and then the retardation "Δn·d" (a change in the polarization state is a product of the refractive index difference "Δn" and the layer thickness "d" of the liquid crystal layer) is optimized with respect to both the transmissive display light and the reflective display light to allow image a display with excellent visibility in both the transmissive mode and the reflective mode.

The transparent electrode is disposed on the overcoat layer. The overcoat layer has the roles to stably form the transparent electrode with excellent adhesion and to be a protective layer for preventing the color filter layer from being damaged due to an etchant or cleaning liquid during the process of forming the transparent electrode. In a typical multigap type liquid crystal device, the layer thickness of the liquid crystal layer has been varied between the transparent display area and the reflective display area by omitting the overcoat layer on the transmissive color filter. However, in the substrate for the liquid crystal panel according to the present invention, the overcoat layer is disposed in the transparent display area as well. Thus, the adhesion of the transparent electrode can be enhanced, and the transmissive color filter layer can be protected.

In the above-described substrate for the electro-optical panel, in consideration of the function of the overcoat layer as the protective film, that is, the resistance against the etchant or cleaning liquid in the process of forming the transparent electrode, the first layer thickness is preferably about 0.05 to 0.2 μm.

Moreover, in order to properly adjust the layer thickness of the liquid crystal layer in the transparent display area and the reflective display area in the multigap structure, the difference between the first layer thickness and the second layer thickness is preferably about 1.4 to 2.6 μm.

The above-described substrate for the electro-optical panel can be utilized to configure an electro-optical panel. Furthermore, an electronic device provided with this electro-optical panel as a display part can be configured.

In another embodiment of the invention, a fabrication method of a substrate for an electro-optical panel has the steps of: forming a transmissive color filter layer over a substrate in a transparent display area; forming a reflective color filter layer over the substrate in a reflective display area; and forming an overcoat layer so as to cover both the transmissive color filter layer and the reflective color filter layer, wherein the overcoat layer has a first layer thickness on the transmissive color filter layer and a second layer thickness, thicker than the first layer thickness, on the reflective color filter layer.

According to the above-described fabrication method of the substrate for the electro-optical panel, the overcoat layer is formed over the transmissive color filter layer and the reflective color filter layer formed over the substrate so as to cover throughout the layers. The overcoat layer is configured to have the first layer thickness on the transmissive color filter layer and the second layer thickness, thicker than the first layer thickness, on the reflective color filter layer. This structure, which is also a called multigap structure, allows an image display with excellent visibility in both the transmissive mode and the reflective mode.

The transparent electrode is formed on the overcoat layer. The overcoat layer has the roles to stably form the transparent electrode with excellent adhesion and to be a protective layer for preventing the color filter layer from being damaged due to the etchant or cleaning liquid during the process of forming the transparent electrode. In the substrate for the liquid crystal panel according to the present invention, the overcoat layer is disposed in the transparent display area as well. Thus, the adhesion of the transparent electrode can be enhanced, and the transmissive color filter layer can be protected.

In consideration of the function of the overcoat layer as the protective film, that is, the resistance against the etchant or cleaning liquid in the process of forming the transparent electrode, the first layer thickness is preferably about 0.05 to 0.2 μm. Furthermore, in order to properly adjust the layer thickness of the liquid crystal layer in the transparent display area and the reflective display area in the multigap structure, a difference between the first layer thickness and the second layer thickness is preferably about 1.4 to 2.6 μm.

In one mode of the fabrication method of the substrate for the electro-optical panel, the overcoat layer forming step has the steps of: forming a first overcoat layer with a first layer thickness; forming a second overcoat layer on the first overcoat layer with a second layer thickness; and removing the second overcoat layer in the transparent display area.

According to this mode, the overcoat layer is first formed in the transparent display area and the reflective display area with the first layer thickness, which is required for the transparent display area. Then, the overcoat layer is formed thereon with the second layer thickness, which is required for the second reflective display area. Then, the overcoat layer in the transparent display area is partially removed to form the multigap structure.

In another mode of the fabrication method of the substrate for the electro-optical panel according to the present invention, the overcoat layer forming step has the steps of: forming the overcoat layer with the second layer thickness; exposing the overcoat layer so as to vary an exposure energy in the transparent display area and the reflective display area; and developing the exposed overcoat layer to allow the transparent display area to have the first film thickness and to allow the reflective display area to have the second layer thickness.

According to this mode, the overcoat layer is formed in the transparent display area and the reflective display area with the second layer thickness, which is required for the reflective display area. Then, the overcoat layer is exposed by varying the exposure energy in the transparent display area and the reflective display area. Then, the overcoat layer in the transparent display area is removed to form the multigap structure at one process step.

DETAILED DESCRIPTION
Liquid Crystal Display Panel

Figure 1:
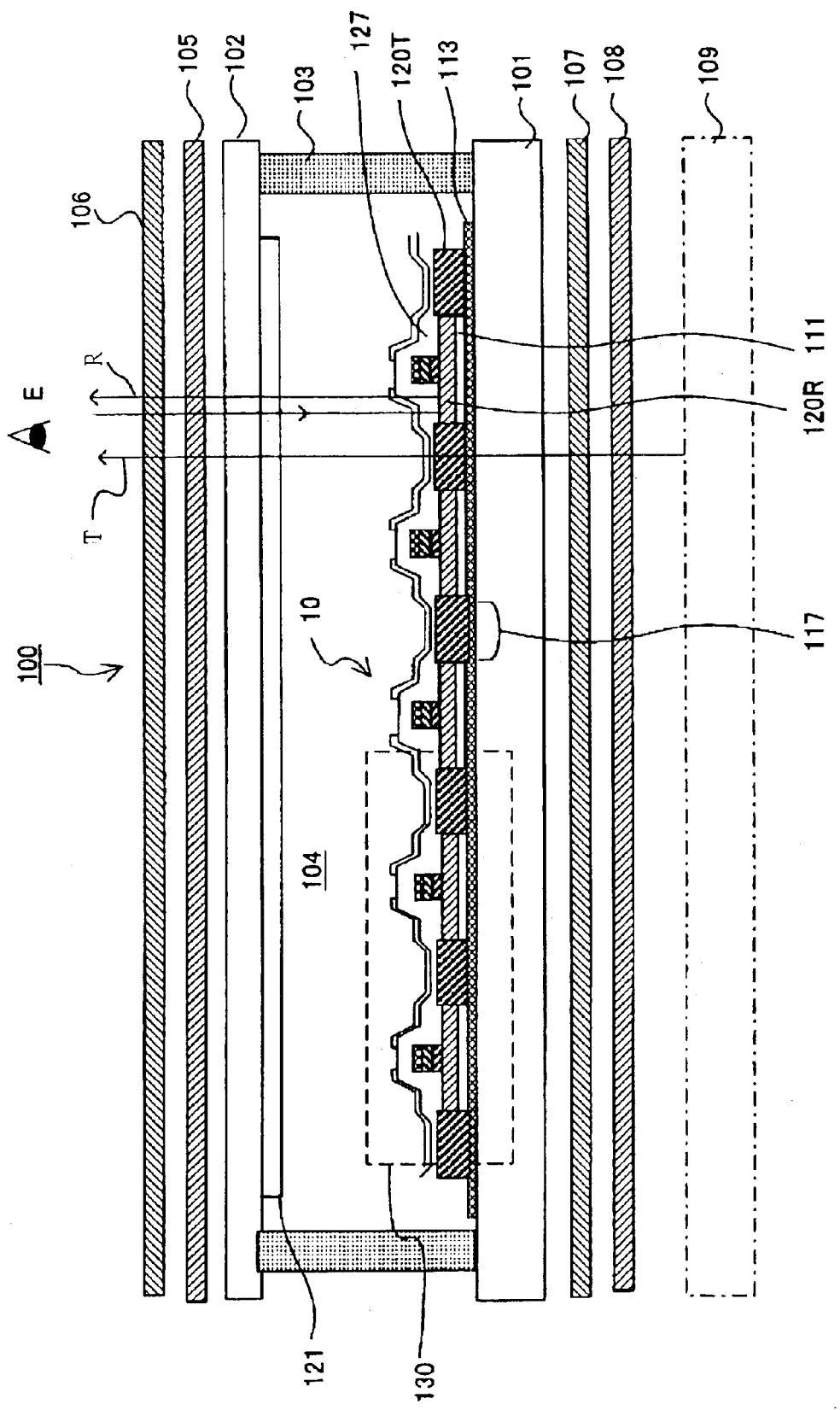
FIG. 1 is a cross-sectional view illustrating the structure of a liquid crystal display panel according to the embodiment of the invention.

First, an embodiment of the liquid crystal display panel applying the invention will be described. FIG. 1 depicts a cross-sectional view of a semi-transparent reflective type liquid crystal display panel, which is an embodiment of the invention.

In FIG. 1, a liquid crystal display panel 100 is formed, in which a substrate 101 is bonded to a substrate 102 (both of which are made of glass or plastic) by a sealing material 103, and liquid crystals 104 are sealed inside thereof. In addition, a retarder 105 and a polarizer 106 are sequentially disposed over the outer surface of the substrate 102, and a retarder 107 and a polarizer 108 are sequentially disposed over the outer surface of the substrate 101. Furthermore, under the polarizer 108, a backlight 109 for emitting luminous light in performing transmissive display is disposed.

Figure 2:
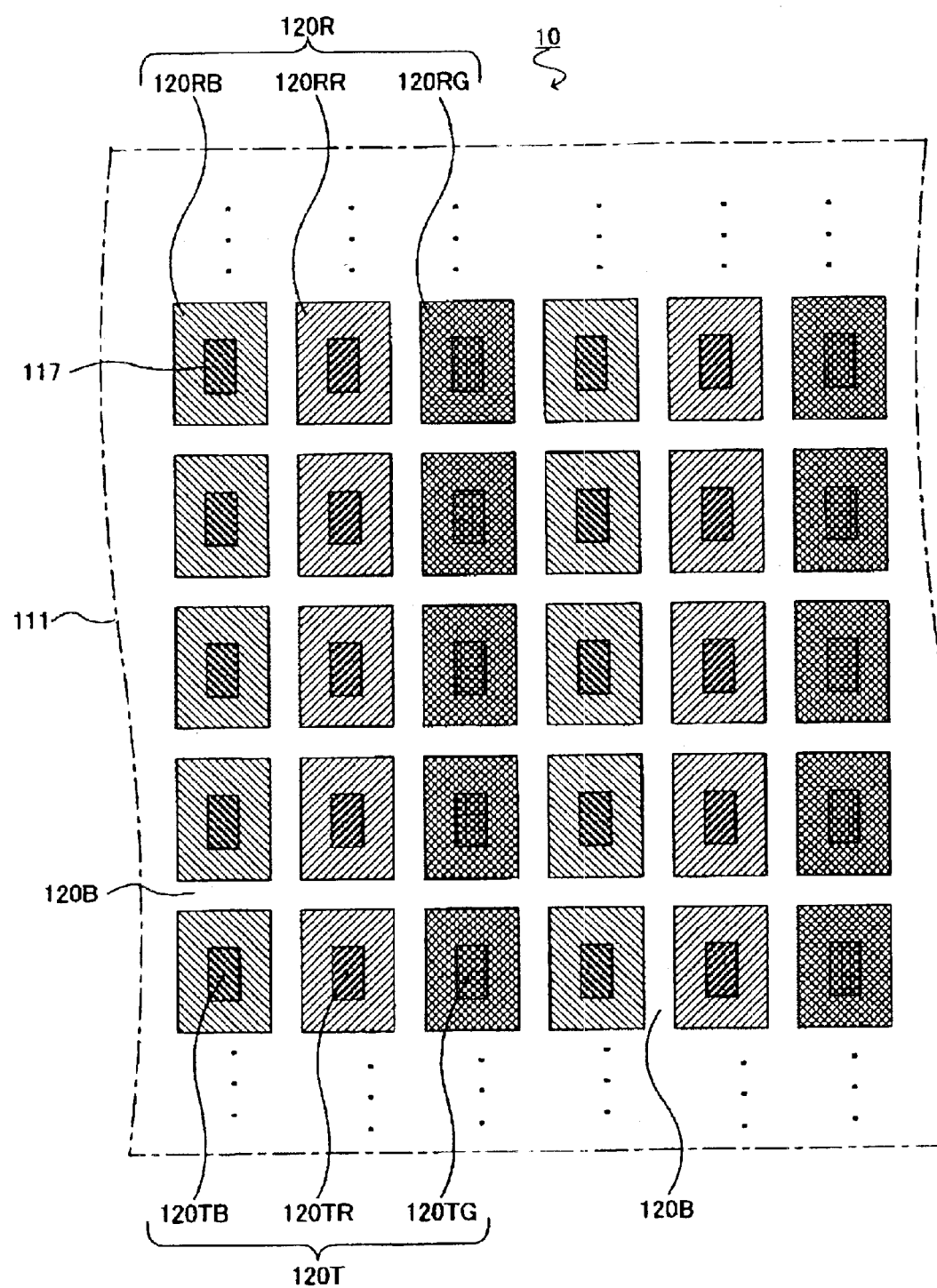
FIG. 2 is a plan view illustrating the structure of the color filter layer of the liquid crystal panel shown in FIG. 1.
Figure 3:
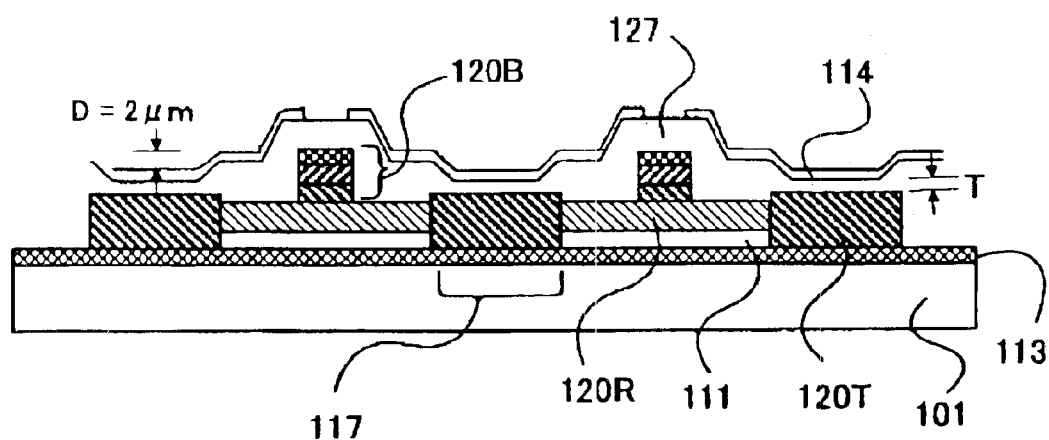
FIGS. 3(a)–(b) are a partially enlarged cross-sectional view of the liquid crystal panel shown in FIG. 1, and a cross-sectional view illustrating the structure of a liquid crystal display panel, in which the overcoat layer is not formed in a transparent display area, as a comparative example.
Figure 3:
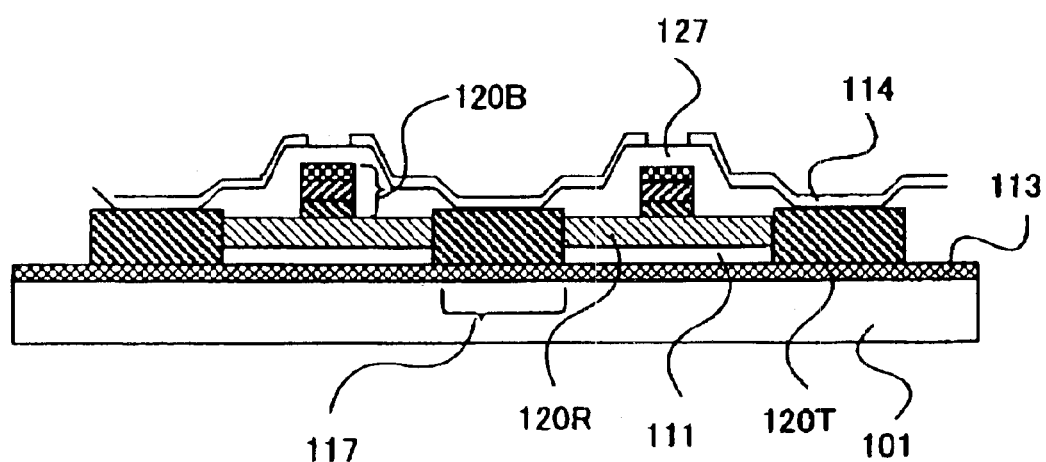

The substrate 101 configures a color filter substrate 10. The color filter substrate 10 is partially depicted in FIG. 1 for convenience of explanation. FIG. 3 depicts an enlarged view of one portion 130. FIG. 2 depicts a plan view of a color filter layer of the color filter substrate 10.

With reference to mainly FIG. 3, as for the color filter substrate 10, a transparent scattering resin layer 113 is formed on the substrate 101 with an acrylic resin, for example. The scattering resin layer 113 can be fabricated by forming a translucent resin layer, for example, with an acrylic resin, on the surface of a substrate such as glass or plastic and forming a structure of a plurality of fine dips and bumps on the resin layer surface.

In addition, on the scattering resin layer 113, a reflective layer 111 such as aluminum alloy or silver alloy is partially formed. The area where the reflective layer 111 is formed is the area to be utilized for reflective type display (hereafter, it is also called "reflective display area"). Therefore, the surface of the reflective layer 111 is formed into a dip and bump shape reflecting the dip and bump structure of the scattering resin layer 113.

Accordingly, when reflective type display is performed with outside light, the outside light is reflected as it is moderately scattered by the dip and bump shape. Thus, the reflected light can be uniform and a wide viewing angle can be secured.

In the reflective layer 111, an opening 117 is formed at predetermined intervals. That is, the reflective layer 111 is not formed in the portion of the opening 117, and the area of the opening 117 becomes the "transparent display area." Then, the area where the reflective layer 111 is formed, that is, the area other than the opening 117 becomes the "reflective display area."

A reflective display color filter layer 120R of each color is formed on the reflective layer 111 in the reflective display area, whereas a transmissive display color filter layer 120T of each color is formed on the scattering resin layer 113 in the transparent display area. The reason why the reflective display color filter layer 120R is formed separately from the transmissive display color filter layer 120T is that display colors can be adjusted separately in transmissive display and reflective display.

Figure 5:
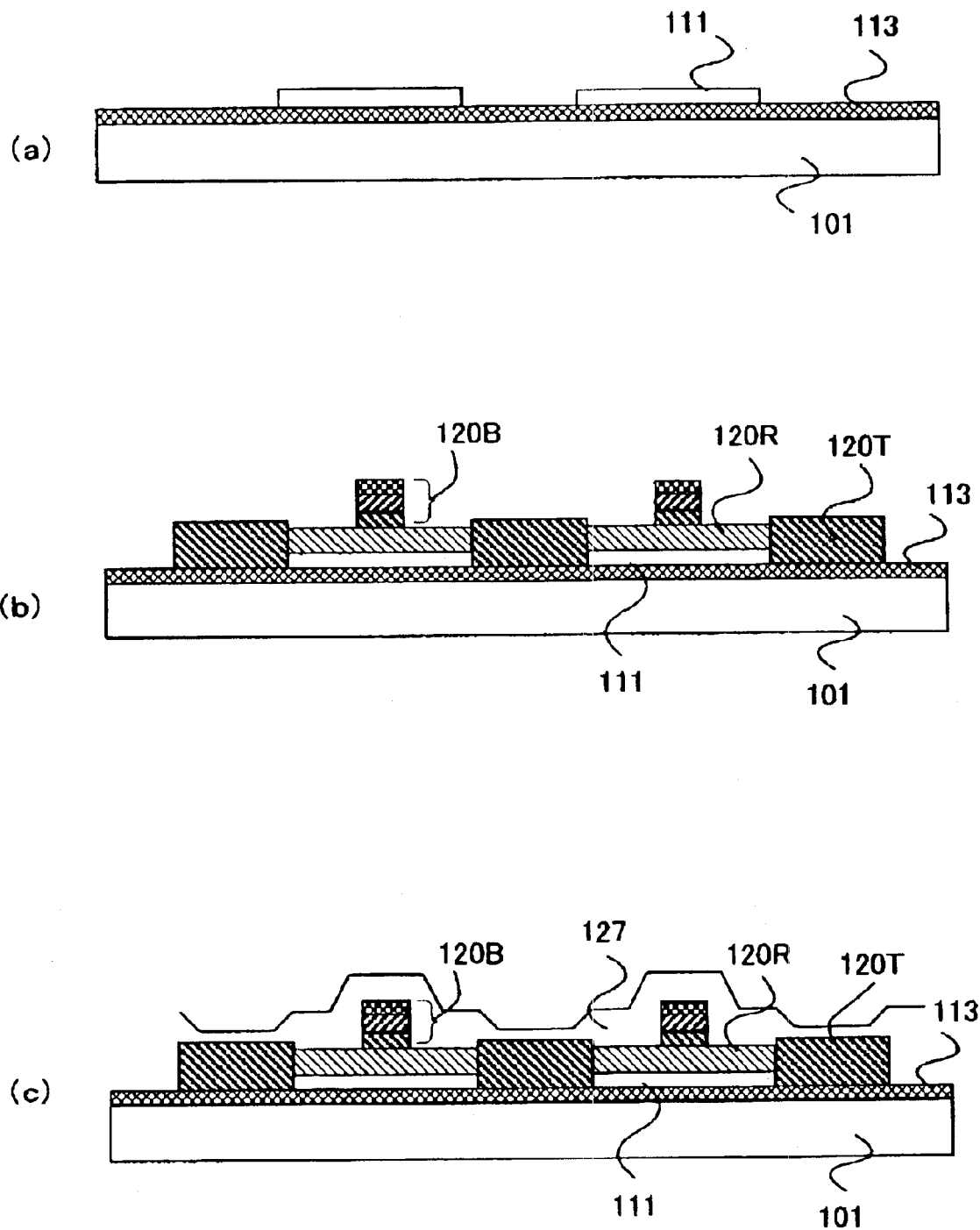
FIGS. 5(a)–(c) are cross-sectional views illustrating the second fabrication method of the color filter substrate of the invention.

FIG. 3 depicts the reflective display color filter layer 120R, The reflective display color filter layer 120R is actually configured of three colored layers R, G and B as shown in FIG. 2. That is, the reflective color filter layer 120R is configured by sequentially arranging a blue (B) colored layer 120RB, a red (R) colored layer 120RR and a green (G) colored layer 120RG. As shown in FIGS. 2 and 3, the transmissive display color filter layer 120T is configured by sequentially arranging a red (R) colored layer 120TR, a green (G) colored layer 120TG and a blue (B) colored layer 120TB. In FIGS. 1, 3 and 5, a cross-section of a portion of the red colored layer is depicted for convenience of explanation.

A black matrix 120B is formed on the border between the colored layers 120RR, 120RG and 120RB of the reflective display color filter layer 120R and the colored layers 120TR, 120TG and 120TB of the transmissive display color filter layer 120T. As shown in FIG. 3, the black matrix 120B is formed by overlaying each of the three colored layers R, G and B configuring the transmissive display color filter layer 120T. The reason why each of the colored layers of the transmissive color filter layer, not the reflective color filter layer, is used is that the transmissive color filter layer is generally designed to have higher color density than the reflective color filter layer, and thus a black matrix having higher density and excellent light blocking properties can be formed by overlaying the three colored layers.

Then, an overcoat layer 127 is formed so as to cover the reflective display color filter layer 120R and the transmissive display color filter layer 120T. The overcoat layer 127 functions as a protective layer for protecting the color filter layers 120R and 120T from corrosion and contamination due to chemical agents during the process of fabricating the liquid crystal display panel.

In addition, the liquid crystal display panel 100 shown in FIG. 1 adopts a so-called multigap structure. The multigap structure is that the thickness of the overcoat layer 127 to be formed is varied to optimize the cell thickness in the transparent display area and the reflective display area and therefore the display performance is improved in both the transmissive display mode and the reflective display mode.

Furthermore, on the surface of the overcoat layer 127 of the color filter substrate 10, a transparent electrode 114 made of a transparent conductor such as ITO (indium tin oxide) is formed. The transparent electrode 114 is formed into a stripe shape arranged side by side in plurals. The transparent electrode 114 extends in the direction orthogonal to a transparent electrode 121 similarly formed into the stripe shape over the substrate 102 shown in FIG. 1. The components of the liquid crystal display panel 100 contained in the crossing area of the transparent electrode 114 and the transparent electrode 121 (a portion within the crossing area consisted of the reflective layer 111, the color filter layer 120, the transparent electrode 114, the liquid crystals 104 and the transparent electrode 121) form a pixel.

As best depicted in FIG. 3(a), the invention is characterized in that the overcoat layer 127 is also formed on the transmissive display color filter layer 120T (120TR, 120TG and 120TB). By forming the overcoat layer 127 also on the transmissive color filter layer in this manner, the adhesion of the overcoat layer 127 to the transparent electrode 114 is enhanced and the transparent electrode 114 can be formed stably. In addition, the overcoat layer 127 completely continuously covers the transmissive display color filter layer 120T. Therefore, an etchant can be prevented from damaging the transmissive display color filter layer 120T, the etchant being used for etching in the process of fabricating the transparent electrode 114 on the overcoat layer 127.

FIG. 3(b) depicts a comparative example, in which the overcoat layer 127 is not formed on the transmissive display color filter layer 120T. In the comparative example, the transparent electrode 114 is directly formed on the transmissive display color filter layer 120T. Therefore, it is likely that the fabrication accuracy of the transparent electrode becomes insufficient and the etchant or cleaning liquid damages the transmissive color filter layer during the process of fabricating the transparent electrode.

The multigap type liquid crystal device shown in the embodiment adapts the multigap structure to adjust the layer thickness of the liquid crystal layer in the transparent display area and the reflective display area so as to produce high quality images. Accordingly, also in the case of applying the invention, it is necessary to form the overcoat layer 127 so that the layer thicknesses in the transparent display area and the reflective display area keep the proper relationship. Generally, as shown in FIG. 3, for the height difference "D" between the top face of the transparent electrode 114 in the transparent display area and the transparent electrode 114 in the reflective display area (the area other than the black matrix part), 2 $\mu$m is appropriate. Therefore, the overcoat layer 127 needs to be formed so as to keep this relationship.

In addition, the layer thickness of the overcoat layer 127 formed on the transmissive color filter in the transparent display area is required to have a layer thickness sufficiently securing the protection function of the overcoat layer 127 as the protective layer. More specifically, about 0.1 $\mu$m can be considered as one criterion, although the thickness depends on the property of the etchant used in the process of forming the transparent electrode or the cleaning liquid used in the subsequent cleaning process.

In addition, an alignment layer is formed on the transparent electrode 114 over the substrate 101 and on the transparent electrode 121 over the substrate 102, as required.

In the liquid crystal display panel 100, in the case of performing reflective type display, the outside light incident enters into the area, where the reflective layer 111 is formed, along a route "R" shown in FIG. 1, and it is reflected by the reflective layer 111, and it is visually recognized by a viewer "E." On the other hand, in the case of performing transmissive type display, the luminous light emitted from the backlight 109 travels along a route "T" shown in FIG. 1, and it is visually recognized by the viewer "E."

Furthermore, in the invention, the array of each of the colored layers of the color filter is not limited to the array shown in FIG. 2. That is, various arrays can be configured, such as a striped array, a delta array and a diagonal array. The transmissive color filter and the reflective color filter are separately formed of different materials in the above-described embodiment, but they can be formed into a single color filter with the same materials. In this case, the invention can be applied to a color filter, in which the thickness of the color filter is varied depending on the transparent display area and the reflective display area.

Fabrication Method

Next, a fabrication method of the liquid crystal display panel 100 will be described. The liquid crystal display panel of the invention is characterized by forming a thin overcoat layer on the transmissive color filter as well. The overcoat layer can be formed according to any one of two methods below.

First Fabrication Method

First, a first fabrication method of the color filter substrate 10 shown in FIG. 1 will be described with reference to FIGS. 4(a) to 4(e).

Figure 4:
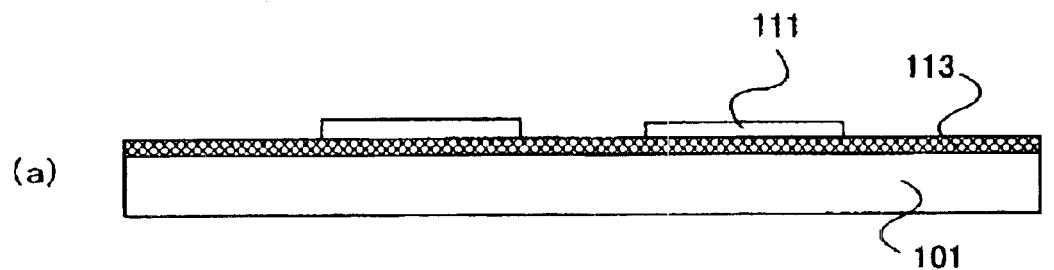
FIGS. 4(a)–(d) are cross-sectional views illustrating the first fabrication method of the color filter substrate of the invention.
Figure 4:
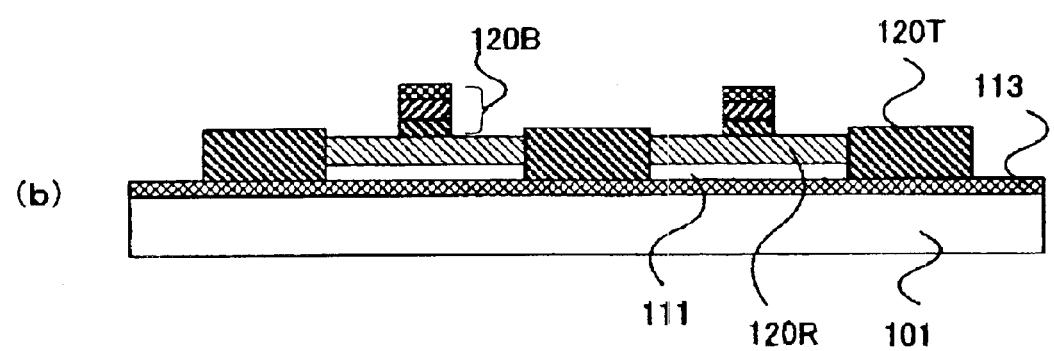
Figure 4:
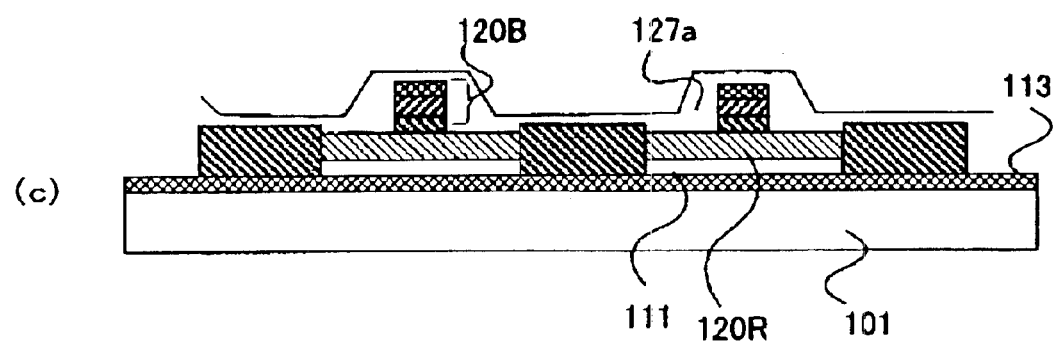
Figure 4:
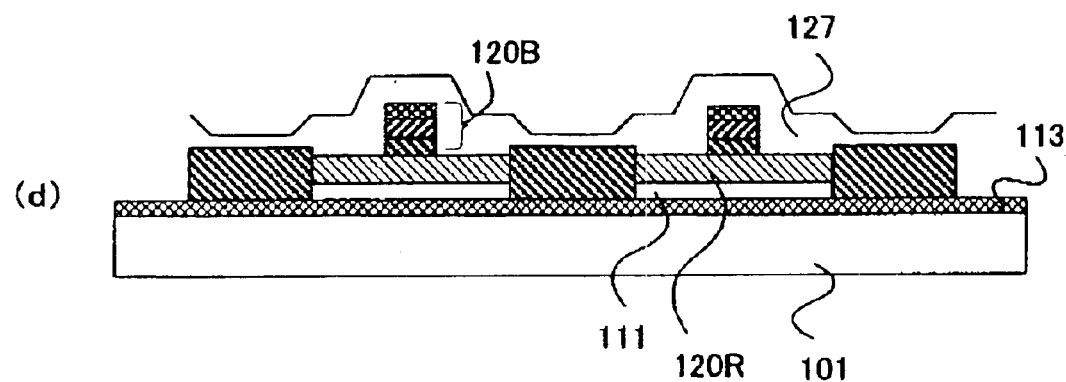

As shown in FIG. 4(a), the scattering resin layer 113 is first formed on the surface of the substrate 101. As the forming method of the scattering resin layer 113, it can be fabricated by forming a translucent resin layer, for example, an acrylic resin, on the surface of a substrate such as glass or plastic and forming a structure of a plurality of fine dips and bumps on the resin layer surface. In addition, as the forming method of the scattering resin layer 113, it is of course possible to adopt methods other than this.

Subsequently, a metal such as aluminum, aluminum alloy and silver alloy is deposited with a thin film form by a vapor deposition or sputtering, and patterned by a photolithographic method to form the reflective layer 111. At this time, the reflective layer 111 is formed only in the reflective display area.

Then, as shown in FIG. 4(b), a colored photosensitive resin (photosensitive resist), consisted by dispersing pigment or die showing a predetermined color phase, is applied, exposed and developed for patterning in a predetermined pattern to form the color filter layer. That is, the transmissive display color filter layer 120T (that is, the colored layers 120TR, 120TG and 120TB) is formed in the transparent display area, and the reflective display color filter layer 120R (that is, the colored layers 120RR, 120RG and 120RB) is formed in the reflective display area.

Subsequently, the black matrix 120B is formed on the reflective color filter layer 120R. The black matrix 120B can be formed by the same materials as each of the colored layers of the transmissive color filter layer 120T. In this case, the black matrix 120B can be formed by sequentially overlaying the each colored layers (120TR, 120TG and 120TB) during the process of forming the transmissive display color filter layer 120T described above.

Then, the overcoat layer 127 is formed with an acrylic resin and the like on the transmissive display color filter layer 120T and the reflective display color filter layer 120R. At this time, in the first fabrication method, the overcoat layer 127 is formed by two process steps. That is, as shown in FIG. 4(c), an overcoat layer 127a is formed completely over the transmissive color filter layer 120T and the reflective display color filter layer 120R with a predetermined thickness, preferably 0.1 $\mu$m or greater.

Then, a second overcoat layer using a photosensitive acrylic resin is applied over the first overcoat layer to cover both the transmissive and reflective color filter layers 120T and 120R, respectively. Using photolithographic techniques (e.g., patterned exposure and developing), at least part of the second overcoat layer is etched away to remove material in the transmissive display area above transmissive color filter layer 120T. As a result, the final overcoat layer 127 has a varying thickness as shown, for example in FIG. 4(d).

Second Fabrication Method

Next, a second fabrication method of the color filter substrate 10 of the invention will be described with reference to FIGS. 5(a) to 5(d). In the first fabrication method shown in FIGS. 4(a) to 4(e), the overcoat layer is formed by two process steps. On the contrary, in the second fabrication method, the overcoat layer 127 is formed by one process step by adjusting the exposure energy when patterning the coated overcoat layer.

As shown in FIGS. 5(a) and 5(b), the second fabrication method is the same as the first fabrication method until forming the scattering resin layer 113, the reflective layer 111, the transmissive color filter layer 120T, the reflective color filter layer 120R, and the black matrix 120B over the substrate 101.

Subsequently, a translucent resin such as a photosensitive acrylic resin is applied over throughout the area of the substrate 101, exposed in a predetermined pattern, and developed for patterning to form dips and bumps of the multigap structure. At this time, the exposure energy is increased in the area of the transmissive display color filter layer 120T more than that in the area of the reflective display color filter layer 120R, and thus the amount of the acrylic resin removed is increased. Consequently, the thickness of the overcoat layer 127 on the transmissive display color filter layer 120T is thinner than that of the overcoat layer 127 on the reflective display color filter layer 120R. Thus, the multigap structure having the thin overcoat layer 127 on the transmissive display color filter layer 120T can be formed. In addition, as a means of adjusting the exposure energy, exposing-time controlling while keeping the irradiation energy of ultraviolet rays constant, or partially controlling the irradiation energy of ultraviolet rays while keeping the irradiation-time constant, may be used.

Fabrication Method of the Liquid Crystal Panel

Figure 6:
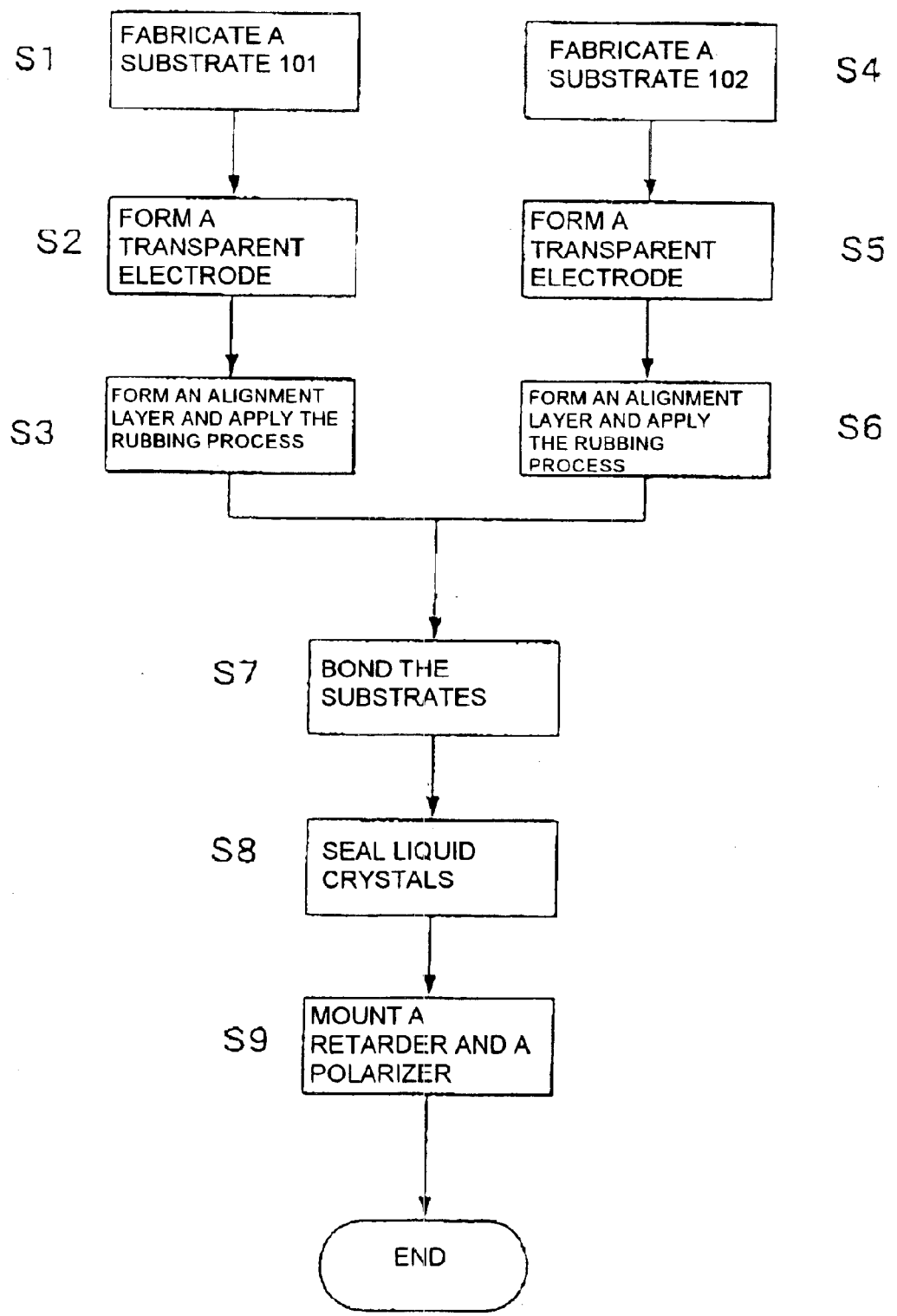
FIG. 6 is a flow chart illustrating the fabrication method of a liquid crystal panel according to the embodiment of the invention.

Next, a method for fabricating the liquid crystal display panel 100 shown in FIG. 1 with the use of the color filter substrate 10 thus obtained will be described with reference to FIG. 6. FIG. 6 is a flowchart illustrating fabrication process steps of the display panel 100.

According to the methods, the substrate 101 formed with the color filter substrate 10 having the thin overcoat layer also on the transmissive color filter is fabricated (Step S1). Furthermore, a transparent conductor is deposited on the overcoat layer 127 by sputtering, and patterned by a photolithographic method to form the transparent electrode 114 (Step S2). After that, an alignment film made of a polyimide resin or the like is formed on the transparent electrode 114, and the rubbing process is applied (Step S3).

In the meantime, the counter substrate 102 is fabricated (Step S4). The transparent electrode 121 is formed in the same way (Step S5). An alignment film is formed on the transparent electrode 121 to apply the rubbing process (Step S6).

Then, the substrate 101 is bonded to the substrate 102 by the sealing material 103 to form a panel structure (Step S7). The substrate 101 is bonded to the substrate 102 so as to have a nearly specified space between the substrates by spacers (not shown), dispersed between the substrates.

Subsequently, the liquid crystals 104 are injected from an opening part of the sealing material 103 (not shown in the drawing), and the opening part of the sealing material 103 is sealed with an end-sealing material such as a UV cured resin (Step S8). Accordingly, the main panel structure is completed, and then the retarder and the polarizer described above are mounted on the outer face of the panel structure by bonding, as required (Step S9). Thus, the liquid crystal display panel 100 shown in FIG. 1 is completed.

Electronic Device

Figure 7:
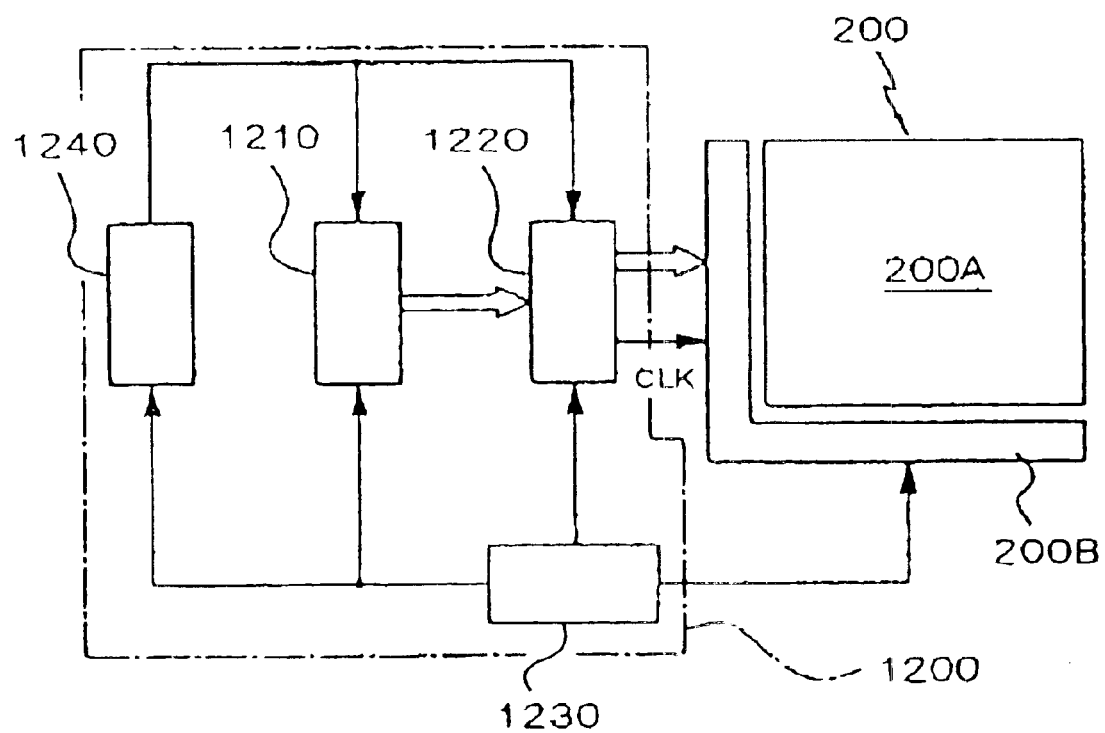
FIG. 7 is a schematic block diagram illustrating the structural block in the embodiment of the electronic device according to the invention.

Next, an embodiment will be described in the case where a liquid crystal device including the above-described liquid crystal display panel is used as the display device of electronic devices. FIG. 7 is a schematic block diagram illustrating the whole configuration of the embodiment. An electronic device shown here has a liquid crystal display panel 200, the same as the liquid crystal display panel 100, and a control unit 1200 for controlling it. The liquid crystal display panel 200 is conceptually depicted separately into a panel structure 200A and a drive circuit 200B formed of a semiconductor integrated circuit and the like. In addition, the control unit 1200 has a display information output source 1210, a display processing circuit 1220, a power circuit 1230, and a timing generator 1240.

The display information output source 1210 is provided with a memory formed of a ROM (Read Only Memory) or a RAM (Random Access Memory), a storage unit formed of a magnetic recording disc or an optical recording disc, and a tuning circuit for tuning and outputting digital image signals, which is configured to feed display information, such as image signals, in a predetermined format based on various clock signals generated by the timing generator 1240, to the display information processing circuit 1220.

The display information processing circuit 1220 is provided with well-known various circuits such as a serial-parallel converter circuit, an amplifier/inverter circuit, a rotation circuit, a gamma correction circuit, and a clamp circuit, which processes the inputted display information and feeds the image information to the drive circuit 200B along with the clock signal "CLK." The drive circuit 200B includes a scanning line drive circuit, a data line drive circuit, and a checking circuit. The power circuit 1230 feeds a predetermined voltage to the above-described each components.

Figure 8:
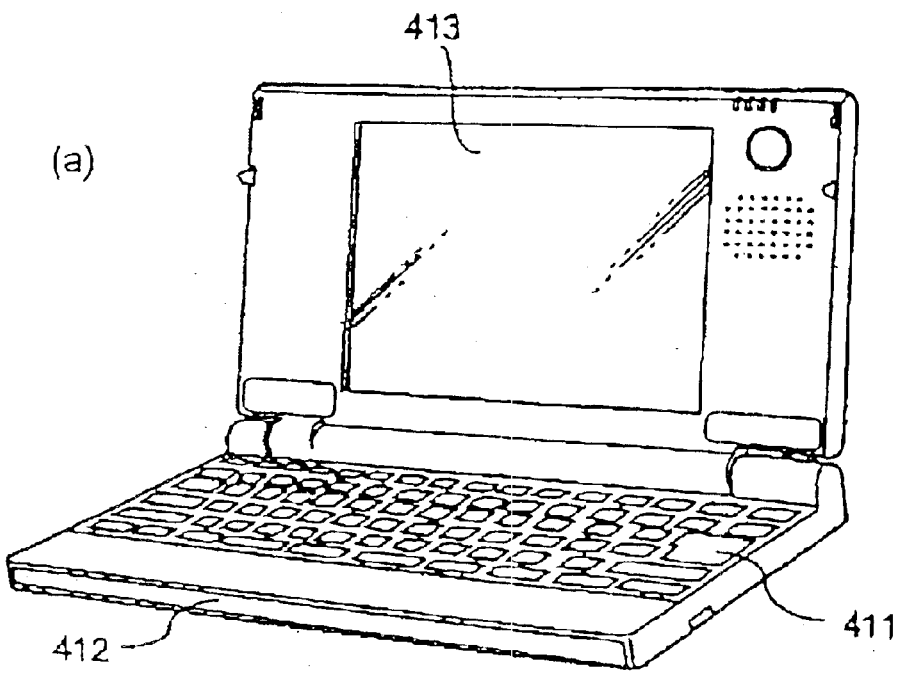
FIGS. 8(a)-(b) are schematic views illustrating examples of electronic devices including the liquid crystal display panel according to the embodiment of the invention.
Figure 8:
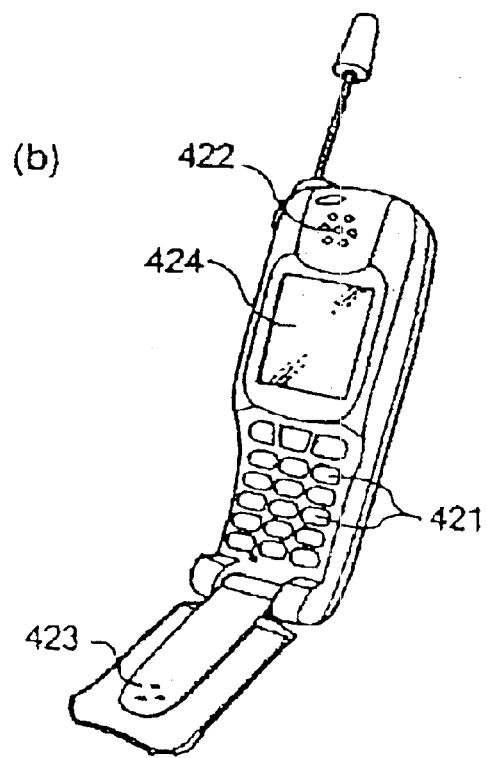

Next, specific examples of the electronic devices applicable with the liquid crystal display panel according to the invention will be described with reference to FIG. 8.

First, an example will be described in which the liquid crystal display panel according to the invention is applied to the display part of a portable personal computer (so-called notebook personal computer). FIG. 8(a) is a perspective view illustrating the configuration of this personal computer. As shown in the drawing, a personal computer 41 is provided with a main body part 412 with a keyboard 411, and a display part 413 adapted with the liquid crystal display panel according to the invention.

Subsequently, an example will be described, in which the liquid crystal display panel according to the invention is adapted to the display part of a mobile phone. FIG. 8(b) is a perspective view illustrating the configuration of this mobile phone. As shown in the drawing, a mobile phone 42 is provided with a plurality of manual operation buttons 421, an earpiece 422, a mouthpiece 423, and a display part 424 adapted with the liquid crystal display panel according to the invention.

In addition, as the electronic devices applicable with the liquid crystal display panel according to the invention, a liquid crystal television, viewfinder and direct view video tape recorders, a car navigation system, a pager, a personal digital assistant, an electronic calculator, a word processor, a workstation, a visual telephone, a point-of-sale terminal, a digital still camera, and the like can be named, other than the personal computer shown in FIG. 8(a) and the mobile phone shown in FIG. 8(b).

The color filter substrate and the liquid crystal display panel are not limited only to the examples above, which can, of course, be modified variously within the scope of the spirit of the invention.

For example, the color filter shown in FIG. 2 has the structure, in which the transparent display area is defined as the opening in the reflective display area, but the structure is merely one example. The structure, in which the color filter is formed by aligning rectangular reflective color filters and transmissive color filters alternately adjacent to each other, is possible.

A passive matrix liquid crystal panel has been exemplified in the embodiments described above. However, the invention can similarly be applied to an active matrix liquid crystal panel (for example, a liquid crystal display panel provided with a TFT (thin film transistor) and a TFD (thin film diode) as a switching element) as the electro-optical device of the invention. The invention can be applied not only to the liquid crystal display panel but also to various electro-optical devices such as an electroluminescent device, an organic electroluminescent device, a plasma display device, an electrophoretic display device, and a field emission display (field emission display device).

Japanese Patent Application No. 2002-108524 filed Apr. 10, 2002 is hereby incorporated by reference.

What is claimed is:

1. An apparatus for an electro-optical panel comprising:
   a substrate;
   a transmissive color filter layer disposed over the substrate in a transparent display area;
   a reflective color filter layer disposed over the substrate in a reflective display area;
   an overcoat layer covering both the transmissive color filter layer and the reflective color filter layer; and
   a liquid crystal layer disposed over the overcoat,
   wherein the overcoat layer has a first layer thickness on the transmissive color filter layer and a second layer thickness, thicker than the first layer thickness, on the reflective color filter layer;
   wherein the liquid crystal layer has a first layer thickness over the transmissive color filter layer and a second layer thickness, thinner than the first layer thickness, over the reflective color filter layer.

2. The apparatus for an electro-optical panel according to claim 1, wherein the first layer thickness is about 0.05 to 0.2 µm.

3. The apparatus of claim 1 incorporated as part of a liquid crystal display.

4. The apparatus of claim 1 further comprising:
   a plurality of transparent electrodes on the overcoat layer.

5. A method of making an electro-optical panel comprising:
   forming a transmissive color filter layer over a substrate in a transmissive display area;
   forming a reflective color filter layer over the substrate in a reflective display area;
   forming an overcoat layer so as to cover both the transmissive color filter layer and the reflective color filter layer, the overcoat layer being formed to have a first layer thickness on the transmissive color filter layer and a second layer thickness, thicker than the first layer thickness, on the reflective color filter layer; and
   disposing a liquid crystal layer over the overcoat, the liquid crystal layer being formed to have a first layer thickness over the transmissive color filter layer and a second layer thickness, thinner than the first layer thickness, over the reflective color filter layer.

6. The method according to claim 5, wherein in the overcoat layer forming step, the first layer thickness is formed to be about 0.05 to 0.2 µm.

7. The method according to claim 5, wherein the overcoat layer forming step comprises:
   forming a first overcoat layer with the first layer thickness;
   forming a second overcoat layer on the first overcoat layer with the second layer thickness; and
   partially removing the second overcoat layer in the transmissive display area.

8. The method according to claim 5, wherein the overcoat layer forming step comprises:
   forming the overcoat layer with the second layer thickness;
   exposing the overcoat layer so as to vary an exposure energy in the transmissive display area and the reflective display area; and
   developing the exposed overcoat layer to cause the transmissive display area to have the first film thickness and to cause the reflective display area to have the second layer thickness.

9. The method of claim 7 wherein at least the second overcoat layer comprises a photosensitive acrylic resin.

10. The method of claim 9 wherein the photosensitive resin is only partially etched away above the transmissive color filter layer to leave the transmissive color filter covered by at least some amount of the resin.

* * * * *